United States Patent [19]

White et al.

[11] 3,995,507
[45] Dec. 7, 1976

[54] ENDLESS POWER TRANSMISSION BELT AND METHOD OF MAKING SAME

[75] Inventors: Jack D. White; James R. Thomas, both of Springfield, Mo.

[73] Assignee: Dayco Corporation, Dayton, Ohio

[22] Filed: Sept. 15, 1975

[21] Appl. No.: 613,655

[52] U.S. Cl. .............................. 74/233; 156/140; 156/141
[51] Int. Cl.² ...................... F16G 5/16; B29H 7/22
[58] Field of Search ............... 74/233, 234, 231 P; 156/140, 141

[56] References Cited
UNITED STATES PATENTS

| | | | |
|---|---|---|---|
| 2,405,496 | 8/1946 | Gingras | 74/233 |
| 2,442,037 | 5/1948 | Carter et al. | 74/233 |
| 2,631,463 | 3/1953 | Waugh | 74/233 X |
| 2,847,865 | 8/1958 | Rockoff et al. | 74/233 |
| 2,945,389 | 7/1960 | Casazza, Jr. | 74/233 |
| 3,151,491 | 10/1964 | Case | 74/233 |

Primary Examiner—Leonard H. Gerin
Attorney, Agent, or Firm—Reuben Wolk

[57] ABSTRACT

An endless power transmission belt and method of making same is provided wherein such belt is made primarily of an elastomeric material and the belt is a flexible, cool running, stress-relieved belt, wherein these characteristics are imparted to the belt by cooperating components thereof including a continuous fabric layer which defines the inside surface of the belt and the fabric layer has a plurality of folded portions extending into the compression section of such belt at spaced positions along the endless path of the belt. Each of the folded portions has associated portions of fabric in contact at an associated interface and the interfaces serve as stress-relief slits for the belt with the associated portions of fabric serving as fabric cushions on opposite sides of an associated stress-relief slit.

20 Claims, 8 Drawing Figures

ENDLESS POWER TRANSMISSION BELT AND METHOD OF MAKING SAME

BACKGROUND OF THE INVENTION

Elastomeric endless power transmission belts of substantially trapezodial cross-sectional configuration or so-called V-belts are used widely throughout industry for various applications. Many of these belts are operated around comparatively small diameter pulleys or sheaves requiring that the belts have high flexibility. Others of these belts, in order to transmit the required rotational torque, are comparatively thick and stiff in order to provide adequate support for their load-carrying sections, whereby these belts operate with high internal stresses and become excessively heated during operation causing premature failure thereof.

There have been numerous techniques and constructions proposed to arrive at V-belts which provide adequate support for their associated load-carrying sections and operate free of stresses and in a substantially cool manner; however, in general, all of these desirable characteristics have not been provided economically in a given belt.

In an effort to provide belts having improved flexibility numerous toothed or cog-type belts have been proposed. An example of such a belt is shown in U.S. Pat. No. 3,464,875. Another example of such a toothed belt is shown in U.S. Pat. No. 2,847,865, where the teeth are physically cut in the belt. However, toothed belts of this type, while providing the desired flexibility, do not always provide optimum support for their associated load-carrying sections and in the instance where the teeth are defined by cutting action, such belts are more easily torn or damaged.

Other belts have been proposed in which efforts have been made to provide belt flexibility without removing material in the belt compression section which supports the load-carrying section. However, such belts usually involve complex manufacturing methods and use of special materials which add to the belt cost, and an example of such a belt is illustrated in U.S. Pat. No. 3,348,422.

Accordingly, the need exists for a simple and economical endless power transmission belt having high flexibility and large load-carrying capacity yet is capable of operating over extended time periods in a stress-relieved and cool manner.

SUMMARY

It is a feature of this invention to provide a simple and economical endless power transmission belt which has comparatively high flexibility and a large load-carrying capacity due to maximum support of its load-carrying section and such belt is capable of operating in a stress-relieved cool manner over an extended operating life.

Another feature of this invention is to provide an endless power transmission belt and method of making same wherein such belt is made primarily of elastomeric material and comprises a compression section having an elastomeric bottom layer and means for stress-relief of the belt during operation thereof around associated sheaves. The stress-relief means comprises a continuous fabric layer defining the inside surface of the belt with the fabric layer having a plurality of folded portions extending into the compresstion section at spaced positions along the endless path of the belt. Each of the folded portions has associated portions of fabric in contact at an associated interface with the interfaces serving as stress-relief slits for the belt and the associated portions of the fabric serving as fabric cushions on opposite sides of an associated stress-relief slit.

Accordingly, it is an object of this invention to provide an endless power transmission belt and method of making same having one or more of the novel features set forth above or hereinafter shown or described.

Other details, features, objects, uses, and advantages of this invention will become apparent from the embodiments thereof presented in the following specification, claims, and drawing.

BRIEF DESCRIPTION OF THE DRAWING

The accompanying drawing shows present preferred embodiments of this invention, in which.

DESCRIPTION OF ILLUSTRATED EMBODIMENTS

Figure 1:
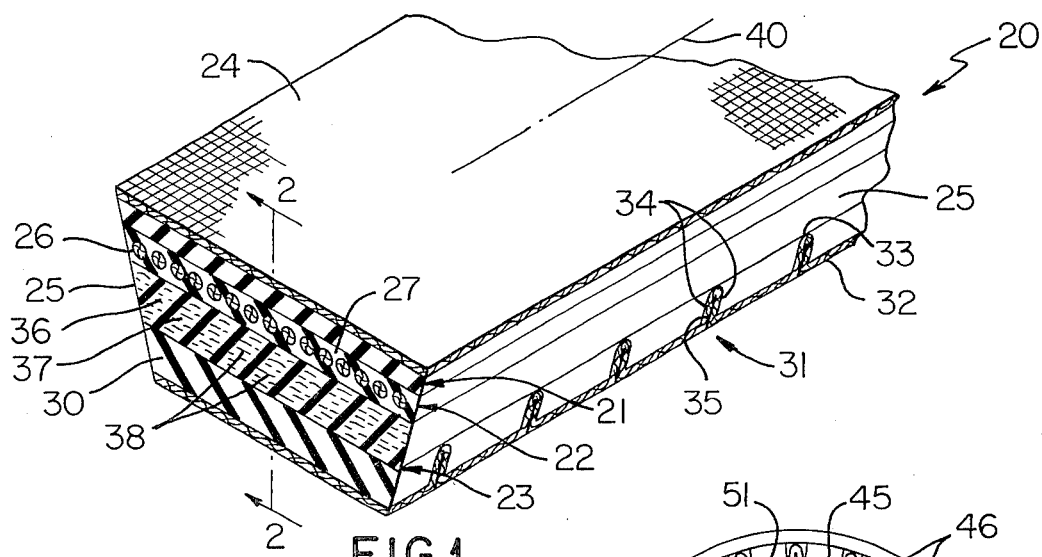
FIG. 1 is a perspective view with parts in cross section, parts in elevation, and parts broken away particularly illustrating one exemplary embodiment of the endless power transmission belt of this invention.
Figure 2:
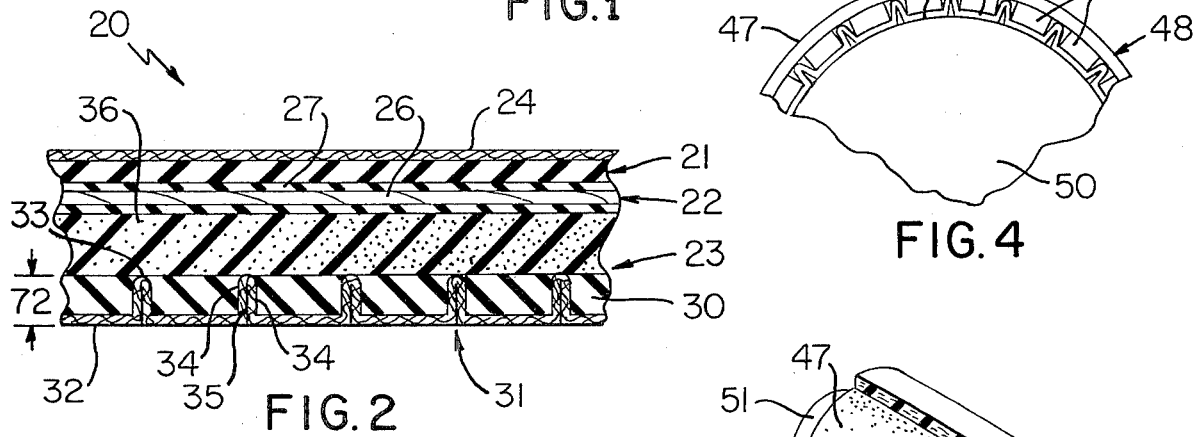
FIG. 2 is a fragmentary cross-sectional view taken essentially of the line 2—2 of FIG. 1.

Reference is now made to FIGS. 1 and 2 of the drawing which illustrate an exemplary embodiment of an endless power transmission belt or V-belt of this invention which is designated generally by the reference numeral 20; and, the belt 20 of this example has a substantially trapezoidal cross-sectional outline and is made primarily of elastomeric material. The belt 20 is capable of carrying substantial loads, has optimum flexibility,, and is, in essence, a stress-relieved belt which operates in a comparatively cool manner around associated pulleys or sheaves of minimum diameter and as will be readily apparent from the description to follow.

The belt 20 comprises a tension section which is designated generally by the reference numeral 21, a load-carrying section 22, and a compression section 23. In addition, the belt 20 has a top fabric cover 24 and the opposed non-parallel sides 25 of the trapezoidal configuration are free of cover material, or the like, whereby the belt 20 is a so-called raw-edged belt.

The tension section 21 of the belt 20 is comprised of a suitable elastomeric material which is shown in this example by cross-hatching as a rubber compound. The tension-section 21 is adjoined on one side thereof by the cover 24 and by the load-carrying section 22 on its opposite side.

The load-carrying section 22 is comprised of a helically wound load-carrying cord 26 which is suitably embedded in a known manner in an elastomeric gum base 27. However, it will be appreciated that the load-carrying section 22 may be made of any suitable material and utilizing any suitable technique known in the art.

The compression section 23 of the belt 20 of this example is unique in that it provides a high-strength support for the load-carrying section 22 yet assures the belt 20 has high flexibility and operates in a stress-relieved and cool manner. The exemplary compression section 23 of belt 20 has an elastomeric bottom layer 30 and means for stress-relief of the belt during operation thereof around associated sheaves. The stress-relief means is designated generally by the reference numeral 31 and comprises a continuous fabric layer 32 which defines the inside surface of the belt 20 and the fabric layer 32 has a plurality of folded portions each designated generally by the reference numeral 33 extending into the compression section and in particular into the elastomeric layer 30 thereof at spaced positions which in this example of the invention are equally spaced along the endless path of the compression section and hence along the endless path of the belt.

Each of the folded portions 33 has associated portions 34 of fabric in contact at an associated interface 35 whereby the interfaces 35 defined by associated portions serve, in essence, as stress-relief slits for the belt 20. Further, the associated portions 34 serve as fabric cushions on opposite sides of an associated stress-relief slit as defined by an associated interface 35.

As the belt 20 travels around associated pulleys or sheaves, such belt tends to compress the compression section in the usual manner while stretching the tension section of the belt. However, the compression of the compression section is easily accommodated by the cushioning action provided by the folded portions 34 of the fabric 32 which also define the interfaces 35 and serve as stress-relief slits whereby such belt 20 is flexed in an easier manner with minimum internal stresses and thus minimum heating enabling the belt 20 to run in a cooler manner.

The load-carrying section 22 of the belt 20 is provided with optimum support by its portions 34 of layer 32 in face-to-face contact at interfaces 35 and elastomeric material comprising the layer 30 adjoining the folded portions 34. In addition, the belt 20 has high flexibility yet without requiring the provision of teeth or cut notches in the compression section. Obviously the provision of teeth or notches in the compression section as achieved in previously proposed belts, results in a reduced amount of support of the load-carrying section of such previously proposed belts.

The compression section 23 of the belt 20 also comprises another layer arranged inwardly of the bottom layer 30 and in this example such other layer of the compression section 23 is in the form of a fiber-loaded layer 36 which is defined by an elastomeric rubber matrix 37 loaded with fibers a representative few of which have been designated by the reference numeral 38. The fibers 38 may be disposed in the belt 20 in any desired pattern to control the transverse rigidity of the belt and in this example such fibers 38 are preferably disposed substantially perpendicular to the central longitudinal axis 40 of the belt 20.

The belt 20 may be made utilizing any suitable technique or method known in the art; however, such belt 20 is preferably made utilizing method steps essentially as described hereinafter and as shown in FIGS. 3, 4, 5, and 6 of the drawing whereby a belt-defining sleeve 41 is first defined and a plurality of belts 20 cut from such sleeve.

Figure 3:
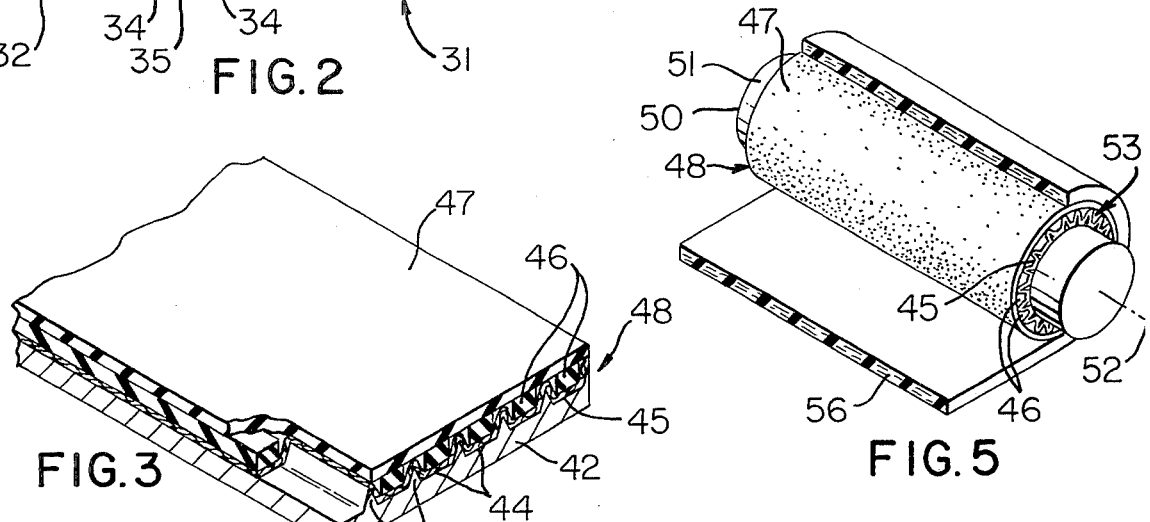

In particular, the preferred method comprises the steps of lining a member 42, as shown in FIG. 3, which has a plurality of alternating ridges 43 and grooves 44 with a fabric material which is designated by the reference numeral 45 to define fabric-lined ridges and grooves. A plurality of elongated strips 46 of elastomeric material are then placed in the fabric-lined grooves and a sheet 47 (shown having an exaggerated thickness) of elastomeric material is placed or laid over the strips to define an assembly which is designated generally by the reference numeral 48.

Figure 4:
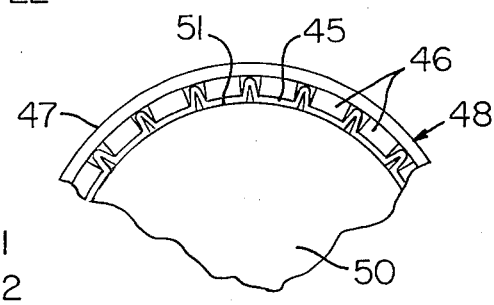
FIGS. 3 thru 6 illustrate a series of method steps which may be employed to define the belt of FIG. 1.
Figure 5:
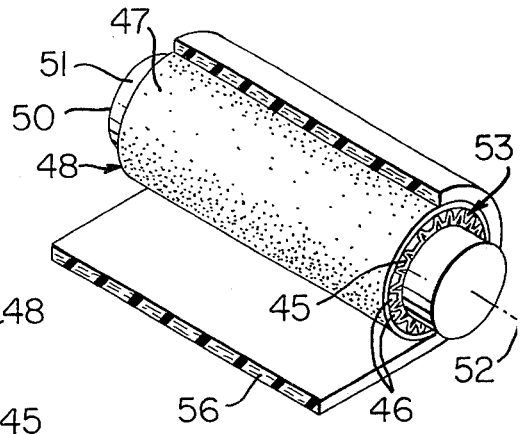

The assembly 48 is removed or suitably lifted away from the member 42 and such assembly is wrapped around a cylindrical drum 50 having a right circular cylindrical outside surface 51 and a fragmentary portion of the drum 50 is illustrated in FIG. 4. The drum 50 is a conventional drum used to build up, cure, and cool a belt-defining sleeve 41, shown in its ready-to-cut form in FIG. 6, from which a plurality of belts 20 are cut and in accordance with techniques which are well known in the art. As seen in FIG. 5, the drum 50 has a central longitudinal axis 52 and the assembly 48 is wrapped around the drum 50 with the fabric-lined projections thereof in contact with the outside cylindrical surface 51 of the drum and with the strips 46 arranged parallel with the axis 52.

As shown in FIGS. 4 and 5, the wrapping step causes the fabric material 45 to have a plurality of folded portions each having associated portions of fabric arranged closely adjacent each other and as shown at 53; and, these associated portions of fabric material 45 of each folded portion previously straddled a common ridge 43 of the member 42 prior to the step of wrapping the assembly 48 against the drum 50.

The remainder of the belt-defining sleeve 41 is defined outwardly of the sheet 47 of the assembly 48 in the usual known manner, and to highlight the manner in which this is achieved, reference is made to FIG. 5 which shows a fiber-loaded sheet 56 of material (which defines the fiber-loaded layer 36 of belt 20) being wrapped in position against the assembly 48. Remaining components of the sleeve 41 are then wrapped concentrically around the layer 56 in a known manner to complete the uncured sleeve.

The uncured belt-defining sleeve is cured in the usual known manner and the curing action causes the strips 46 and sheet 47 to flow together as a unitary mass to define an inner layer portion 60 of the completed sleeve which when the individual belts are cut from such sleeve define layer 30 of the compression section. The cured sleeve 41 is then cooled utilizing techniques which are known in the art.

Figure 6:
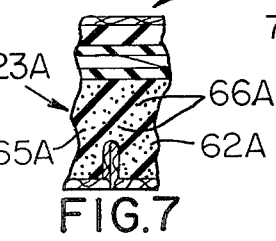

The sleeve 41 is cut as illustrated in FIG. 6 by supporting the drum 50 for rotation on a pair of supports, one of which is indicated schematically by an arrow 61 in FIG. 6, and suitable cutting means shown as a rotary cutter 62 is employed to cut the sleeve 41 and define a plurality of endless power transmission belts 20. The cutter 62 may be rotated while rotating the sleeve 41 and may be provided with suitable means indicated schematically by a double arrow 63 to move the cutter 62 toward and away from the sleeve 41.

Figure 7:
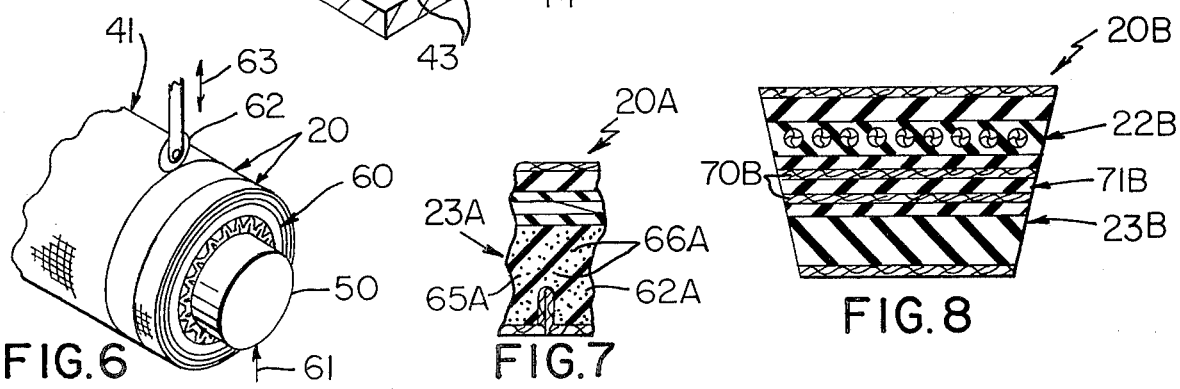
FIG. 7 is a fragmentary cross-sectional view similar to FIG. 2 illustrating another exemplary embodiment of the belt of this invention.
Figure 8:
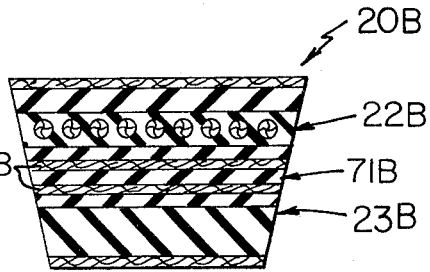
FIG. 8 is a fragmentary cross-sectional view illustrating still another exemplary embodiment of the belt of this invention.

Other exemplary embodiments of the belt of this invention are illustrated in FIGS. 7 and 8 of the drawing. The belts illustrated in FIGS. 7 and 8 are similar to the belt 20; therefore, such belts are designated by the reference numerals 20A and 20B respectively and representative parts of each belt similar to corresponding parts of belt 20 will be designated in the drawing by the same reference numeral as in the belt 20 (whether or not such representative parts are mentioned in the specification) followed by an associated letter designation, either A or B and will not be described in detail. Only those component parts of each belt 20A and 20B which are different from corresponding parts of the belt 20 will be designated by new reference numerals also followed by associated letter designations and described in detail.

The main difference between the belt 20A of FIG. 7 and the belt 20 is that the bottom layer 62A of the belt 20A, instead of being an unreinforced layer such as the layer 30 of the belt 20, is a fiber-reinforced elastomeric layer 62A and layer 62A is the only elastomeric layer in the the compression section 23A. Layer 62A is defined by an elastomeric matrix material 65A which has a plurality of reinforcing fibers 66A which are randomly disposed in the compression section and arranged so that they extend substantially perpendicular to the longitudinal axis of the belt 20A.

The main difference between the belt 20B of FIG. 8 and the belt 20 is that the compression section 23B instead of having a fiber-loaded layer arranged inwardly of its bottom layer 30B has a plurality of two fabric layers each designated by the reference numeral 70B. The layers 70B are arranged in parallel relation and parallel to the load-carrying section 22B and such layers 70B are embedded in an elastomeric matrix 71B.

As will be readily apparent from the drawing, the folded portions of the bottom fabric layer of each belt extends into its compression section roughly the same distance. To illustrate this point reference is made to FIG. 2 of the drawing and it will be seen that the folded portions 34 extend into the compression section substantially the same distance 72. It has been found that this same distance 72 may range between 5 and 60 percent of the thickness of the compression section, and in each of the belts 20, 20A, and 20B it has been found that by providing folded portions extending into its associated belt as indicated such belt has the desired flexibility and is stress-relieved in the desired manner whereby each belt operates in a cooler manner.

In this disclosure of the invention each of the belts is shown by cross hatching as being comprised of elastomeric material in the form of rubber. However, it will be appreciated that each belt may be made of one or more suitable elastomeric materials including both rubber and synthetic plastic materials.

It will also be appreciated that fibers 38 and 66A comprising the belts 20 and 20A respectively may be made of any suitable material known in the art; and, the fibers may be of any suitable diameter and length and arranged in any desired pattern relative to the longitudinal axis of the belt associated therewith to impart the desired characteristics to such belts.

In this disclosure reference is made to the layers 32, 32A, and 32B as being fabric layers and it is to be understood that each of such fabric layers may be woven fabric, non-woven fabric, or knitted fabric, as desired.

While present exemplary embodiments of this invention, and methods of practicing the same, have been illustrated and described, it will be recognized that this invention may be otherwise variously embodied and practiced within the scope of the following claims.

What is claimed is:

1. An endless power transmission belt made primarily of elastomeric material and comprising a compression section having an elastomeric bottom layer and means for stress-relief of said belt during operation thereof around associated sheaves, said stress-relief means comprising, a continuous fabric layer defining the inside surface of said belt, said fabric layer having a plurality of folded portions extending into said compression section at spaced positions along the endless path of said belt, each of said folded portions having associated portions of fabric in contact at an associated interface, said interfaces serving as stress-relief slits for said belt, and said associated portions of said fabric serving as fabric cushions on opposite sides of an associated stress-relief slit.

2. A belt as set forth in claim 1 in which said bottom layer is an elastomeric layer free of reinforcing materials.

3. A belt as set forth in claim 1 in which said bottom layer is a fiber-reinforced elastomeric layer.

4. A belt as set forth in claim 1 in which said compression section comprises at least one additional layer arranged inwardly of said bottom layer.

5. A belt as set forth in claim 4 in which said additional layer is a fiber-reinforced elastomeric layer.

6. A belt as set forth in claim 4 in which said additional layer is a fabric layer embedded in an elastomeric matrix.

7. A belt as set forth in claim 1 in which said folded portions are equally spaced along said endless path.

8. A belt as set forth in claim 1 in which each of said folded portions extends into said compression section roughly the same distance.

9. A belt as set forth in claim 8 in which said same distance ranges between 5 and 60 percent of the thickness of said compression section.

10. A belt as set forth in claim 1 and further comprising a load-carrying section adjoining said compression section and a tension section adjoining said load-carrying section.

11. A belt as set forth in claim 10 in which said load-carrying section comprises a helically wound load-carrying cord.

12. A belt as set forth in claim 11 and further comprising a cover disposed against said tension section and defining the outside surface of said belt.

13. A belt as set forth in claim 12 and having a substantially trapezoidal cross-sectional outline wherein the non-parallel sides of said trapezoidal outline are raw edged and thus free of a covering material.

14. A belt as set forth in claim 1 in which said bottom layer is a fiber-reinforced elastomeric layer and is the only elastomeric layer of said compression section.

15. A method of making elastomeric endless power transmission belts comprising the steps of, lining a member having a plurality of alternating ridges and grooves with a fabric material to define fabric-lined ridges and grooves, placing a plurality of elongated strips of elastomeric material in said fabric-lined grooves, laying a sheet of elastomeric material over said strips to define an assembly, removing said assembly from said member and wrapping said assembly around a cylindrical drum having a central longitudinal axis with said fabric-lined projections in contact with the outside surface of said drum and with said elongated strips arranged parallel with said central longitudinal axis, said wrapping step causing said fabric material to have a plurality of folded portions each having associated portions of fabric material arranged closely adjacent each other, building the remainder of a belt-defining sleeve outwardly of said assembly, curing and cooling said sleeve causing the strips and sheet of said assembly to flow together as a unitary mass to define a compression section of said belts to be cut from said sleeve and wherein said associated portions of fabric material are folded against each other, and cutting said sleeve to define a plurality of said endless power transmission belts wherein each belt has a compression section which comprises an elastomeric bottom layer defined by a part of said unitary mass and means for stress-relief of each belt during operation thereof around associated sheaves, said stress-relief means of each belt comprising a continuous fabric layer which defines the inside surface of the belt with said fabric layer being an annular portion of said fabric material, said fabric layer of each belt having a plurality of folded portions extending into its compression section at spaced positions along the endless path of the belt, each of said folded portions having associated portions of fabric in contact at an associated interface, said interfaces of each belt serving as stress-relief slits for the belt and said associated portions of fabric serving as fabric cushions on opposite sides of an associated stress-relief slit.

16. A method as set forth in claim 15 in which said placing step comprises placing a plurality of elongated strips of elastomeric material which is free of reinforcing means.

17. A method as set forth in claim 16 in which said laying step comprises laying a sheet of elastomeric material over said strips wherein said sheet is free of reinforcing means.

18. A method as set forth in claim 15 in which said step of building the remainder of a belt-defining sleeve outwardly of said assembly comprises wrapping material which defines a load-carrying section in each belt cut from said sleeve and wrapping material which defines a tension section in each belt cut from said sleeve.

19. A method as set forth in claim 15 in which said placing and laying steps comprise placing elongated strips of rubber and a sheet of rubber respectively.

20. A method as set forth in claim 15 in which said lining step comprises lining a rigid member having roughly V-shaped projections.

* * * * *